(12) United States Patent
Morgenbrod et al.

(10) Patent No.: US 9,121,578 B2
(45) Date of Patent: Sep. 1, 2015

(54) LIGHT SOURCE UNIT WITH PHOSPHOR ELEMENT

(75) Inventors: Nico Morgenbrod, Berlin (DE); Matthias Morkel, Berlin (DE); Henning Rehn, Berlin (DE)

(73) Assignee: OSRAM GmbH, Munich (DE)

( * ) Notice: Subject to any disclaimer, the term of this patent is extended or adjusted under 35 U.S.C. 154(b) by 210 days.

(21) Appl. No.: 13/805,990

(22) PCT Filed: Jun. 24, 2010

(86) PCT No.: PCT/EP2010/058998
§ 371 (c)(1),
(2), (4) Date: Dec. 20, 2012

(87) PCT Pub. No.: WO2011/160693
PCT Pub. Date: Dec. 29, 2011

(65) Prior Publication Data
US 2013/0094182 A1      Apr. 18, 2013

(51) Int. Cl.
*F21V 9/16*    (2006.01)
*G03B 42/02*   (2006.01)
*H04N 9/31*    (2006.01)
*G02B 27/14*   (2006.01)

(52) U.S. Cl.
CPC . *F21V 9/16* (2013.01); *G03B 42/02* (2013.01); *H04N 9/315* (2013.01); *G02B 27/141* (2013.01)

(58) Field of Classification Search
CPC .................................. F21V 9/16; G02B 27/141
USPC ............ 362/84, 231, 235, 244; 313/501–503; 353/94
See application file for complete search history.

(56) References Cited

U.S. PATENT DOCUMENTS

| 2005/0270775 | A1* | 12/2005 | Harbers et al. | ............... 362/231 |
| 2008/0030984 | A1  | 2/2008  | Harbers et al. | |
| 2009/0116215 | A1  | 5/2009  | Falicoff et al. | |
| 2011/0058145 | A1* | 3/2011  | Conner et al.  | ................. 353/20 |

FOREIGN PATENT DOCUMENTS

| CN | 171792 | 1/2006 |
| CN | 101231378 | 7/2008 |
| EP | 1 605 199 | 12/2005 |
| WO | WO 2006/124993 | 11/2006 |

* cited by examiner

*Primary Examiner* — Karabi Guharay
(74) *Attorney, Agent, or Firm* — Cozen O'Connor (57) ABSTRACT

A light source unit comprising: a pump light source (1) for an emission of pump light (2), a phosphor element (3) for a conversion of said pump light (2) into converted light (4), an optical system (6) for transmitting at least a part of said converted light (4) for further use, wherein at least a part of said pump light (2) is coupled into said optical system (6) and transmitted by said optical system (6) to said phosphor element (3) for said conversion.

14 Claims, 6 Drawing Sheets

LIGHT SOURCE UNIT WITH PHOSPHOR ELEMENT

RELATED APPLICATIONS

This is a U.S. National Phase application under 35 USC 371 of International Application PCT/EP2010/058998 filed on Jun. 24, 2010.

FIELD OF THE INVENTION

This invention relates to a light source unit comprising a pump light source for an emission of pump light and a phosphor element for a conversion of the pump light into converted light.

BACKGROUND OF THE INVENTION

There is an increasing need for high luminance light sources in applications from projection systems and high speed industrial inspection to optical fibre-coupled illumination in surgical endoscopy. Therein, bright dis-charge lamps are the state of the art being broadly used today. Recent developments are heading for a combination of solid-state light sources, in particular light emitting diodes (LED), and light converting phosphor elements. Therein, the typically blue or ultraviolet solid-state based light is converted to light having less energy and a longer wave length by a transmission through the phosphor element.

SUMMARY OF THE INVENTION

One object of the invention is to provide an improved light source unit having a pump light source and a phosphor element.

One aspect of the invention is directed to a light source unit, which is, besides the pump light source and the phosphor element, further comprising an optical system for transmitting at least a part of the converted light for further use, wherein at least a part of the pump light is coupled into this optical system and transmitted by the optical system to the phosphor element for the conversion.

Hence, the optical system is, on the one hand, transmitting converted light for the further use, for example by bridging a spatial distance between the phosphor element and by adjusting the cross-section of a beam or its angular extent. On the other hand, the optical system is, according to this invention, also used for transmitting pump light to the phosphor element, thus having a double function advantageously.

This integration of functions allows a reduction of the space required for the light source unit, which for example can simplify the handling of the light source unit during production and also reduce cost for transport and storage. Further, a size reduction is particularly desirable with respect to a final product, for example in consumer applications as projection systems.

The optical system can, as mentioned above, have a varying function with respect to the further use. It can be an imaging optical system including imaging optical elements, as for example lenses, however, the optical system can also comprise non-imaging optical elements, such as compound concentrators or light guides.

The phosphor element converts the pump light by an absorption of the pump light and an emission of light having a lower energy and a longer wave length, wherein a spontaneous emission, not a stimulated emission, is dominant. A phosphor type illustrating, but not limiting the present invention is Ce or Eu doped YAG (Yttrium Aluminum Garnet).

The optical system transmits the converted light from the phosphor element preferably to an exit aperture of the light source unit, which can for instance serve as an imager of a projection system or as an input of an optical fibre. Therein, according to one embodiment, the optical system can provide an image of a part of the phosphor element or of the element as a whole to the exit aperture, or it can, according to another embodiment, also provide an image of a surface of an additional nonimaging optical element, which collects light from the phosphor element, to the exit aperture.

Preferred embodiments appear from the following description, wherein the details refer to aspects of the invention and are meant as being disclosed individually. Further, the invention is not restricted to the apparatus category, but also disclosed in terms of methods applying the features disclosed herein or a use of respective light source units or lighting systems.

According to a first embodiment, the optical system of the light source unit is at least one-sided telecentric. Preferably, it is telecentric on two sides, an object and an image side. In this way, a high transmission efficiency for light beams being symmetrical with respect to the optical axis can be ensured, such that the transmission of converted or pump light can be optimized.

It is further preferred that the telecentric optical sys-tern comprises two lenses and has an aperture plane between these lenses, wherein the pump light is coupled into the optical system in a region between the lenses, which is referred to as "aperture region". A lens can be a single lens element, namely one individual lens, or also a lens system comprising two or more lens elements. Coupling the pump light into the aperture region can be advantageous, as the pump light can, depending on its angular extent, preferably be homogenized for a uniform illumination of the phosphor element.

The aperture plane is, in this context, not necessarily physically limiting the cross-section of a beam, as in case of an aperture stop or diaphragm, but is a region within the telecentric optical system, in which parallel rays from the object are focused and rays emerging from an object point are collimated.

Another preferred embodiment relates to a light source unit with the optical system having an aperture plane and being symmetrical with respect to the aperture plane.

In an embodiment of this invention, the cross-section of the optical system in an area perpendicular to a main propagation direction of the light, in particular of its aperture plane, will be large with respect to the phosphor area, preferably larger than a projection of the phosphor element into the same area, to maximize the amount of light collected. As a consequence of conservation laws, the angular extent of the light (in the following referred to as the "aperture angle") is much smaller in the aperture plane or in the aperture region than its original emission angle at the phosphor element.

A coupling of the pump light into the optical system in the aperture region is advantageous, as any shadowing in the aperture region does not cut a specific part from the image but, instead, homogeneously reduces the brightness in an exit aperture.

Coupling the pump light into the aperture region of the optical system is therefore particularly advantageous in combination with another preferred embodiment, according to which the optical system comprises a mirror, wherein the pump light is coupled to the mirror within the optical system.

The mirror is preferably provided in the aperture region of the optical system and reflects at least a part of the pump light towards the phosphor element via a part of the optical system. In this context, even a mirror reflecting not only the pump light but also the converted light can be provided between the lenses, as a sufficiently small mirror will only slightly reduce the brightness of the converted light transmitted by the optical system, for example to an exit aperture.

Furthermore, the coupling of pump light into the optical system can also be realized with a dichroic mirror, which for example reflects pump light and transmits converted light. It is advantageous to provide the dichroic mirror in the aperture region, as the above mentioned aperture angle is a minimum of the angular extent of the converted light. Further, the performance of a dichroic mirror can depend on an angle of incidence, such that a good performance can be obtained for the small angular extent of the angles of incidence in the aperture region.

A preferred embodiment thus relates to a coupling by a dichroic mirror, which can for example be an interference mirror having a layer system.

In one embodiment, the invention relates to using the imaging optical system directly for collecting the converted light, thus imaging the phosphor element, for example to an exit aperture of the light source unit.

According to a different embodiment of the invention, a non-imaging optical element is provided between the phosphor element and the optical system, such that the optical system being an imaging one images an exit face of the non-imaging optical element, preferably to an exit aperture of the light source unit. The non-imaging optical element is provided for collecting light from the phosphor element and transmitting it to the optical sys-tern. It can be designed for example as a hollow light pipe having a reflective coating at its inner surfaces or as a dielectric light guide, which guides the light by total internal reflection within a core having a higher refractive index than a cladding or a surrounding medium, for example as surrounding air.

The tube or guide can preferably have an elongated shape with respect to the propagation direction of the light and can further have a circular or rectangular cross-section in an area perpendicular to this propagation direction. Further, the guide or tube can have a funnel-like shape with a entry face being located at the phosphor element and an exit face larger than the entry face being imaged by the optical system, for example to its exit aperture. A combination of the funnel-like shape and the rectangular cross-section will result in a trapezoidal cross-section in an area comprising the main propagation direction. In comparison to providing only an imaging optical system, collecting light from the phosphor element can be improved by additionally using a non-imaging optical element, as imaging systems with acceptance angles close to 90° (the phosphor is a Lambertian emitter) are hard to realize or inefficient.

In this context, it is further preferred that an air gap is provided between an entry face of a dielectric non-imaging optical element and the phosphor element. The transition from air having a refractive index around 1 to the dichroic non-imaging optical element, for example a glass material, having a refractive index above 1, preferably above 1.4, leads to a refraction of the converted light towards a normal on the entry face, thus towards the main propagation direction in the tube or guide. Hence, light can be collected more efficiently by the non-imaging optical element.

Providing a non imaging optical element is further advantageous, as it enables a completely symmetrical telecentric optical system, which provides an image of the exit face of the non-imaging element to an exit aperture of the light source unit with a unitary magnification. In this way, aberrations, as for example a distortion and a lateral color, can be avoided, thus ensuring a highly efficient transmission of light.

Preferably, the pumping light is incident in a main propagation direction onto the phosphor element with this main propagation direction being opposite to a main propagation direction of the converted light. Thus, the phosphor element is operated in reflection mode, wherein a deviation from 180° of +/−45° is also considered as "opposite direction". Therein, the main propagation direction can, for example in case of a diverging or converging beam, be a mean or average direction of propagation (this refers to the disclosure as a whole).

Therefore, the phosphor element can, according to another preferred embodiment, be provided on a heat sink being not translucent for the pump light. The heat sink transfers heat, which can be generated within the phosphor element for example due to the Stokes shift during the conversion, away from the phosphor element. Therefore, a material having a good thermal conductivity is preferably provided for the heat sink, for example a metal, e.g. copper, aluminum, or alloys thereof. Further, the heat sink is preferred to have a large surface for a transmission of heat to a surrounding medium, for example to surrounding air, such that also cooling fins can be provided. In this respect, the operation of the phosphor element in reflection mode allows a straightforward heat sink design.

A further aspect of the invention relates to the coupling of the pump light, which is, with the optical system having an optical axis and an aperture angle, preferably coupled to the optical axis such that its maximum angle to the optical axis is after the coupling equal to or less than the aperture angle of the system, which is an optical design dependent value therein, the "maximum angle to the optical axis" is the angular extend of the pump light beam. In combination with the cross-section of the pump light beam being preferably equal to or smaller than the cross-section of the aperture region in an area perpendicular to a main propagation direction, the angular extent of the beam being smaller than or equal to an aperture angle of the optical system can for example ensure that only those phosphor positions are excited, from which the converted light can then be transmitted by the optical system.

Reflecting a highly collimated pump light, which can for example be provided by a LASER, into the optical system by the aforementioned mirror could disadvantageously lead to concentrated pump light spots on the phosphor element or on a entry face (exit face for the converted light) of a non-imaging optical element. Therefore, it is preferred to slightly defocus any highly collimated pump light while keeping the resulting angular extent smaller than the aperture angle of the optical system. In case of a non-imaging optical element between the phosphor element and the optical system, the inventors found that it is advantageous to provide pump light entering the aperture region of the optical system slightly divergent. In this way, the focus can be shifted from the phosphor element or the entry face towards an inner region. In this way, a mixing of the pump light in the non-imaging optical element becomes surprisingly much more effective, which results in a homogeneous distribution of the pump light on the phosphor element.

According to a preferred embodiment, the converted light has a first spectral distribution and an additional light source is provided, which emits additional light with a second spectral distribution, wherein the additional light is coupled to the optical system for a superposition with the converted light. The second spectral distribution can supplement the first spectral distribution, for example by adding individual lines or even spectral ranges. Thus, the resulting spectrum can for example be more evenly distributed, if a spectral minimum is filled, or have a broader distribution, if a spectral region is added. In this way, the converted light can be adapted to the specific requirements of an application.

One embodiment of the invention provides a Light Emitting Diode (LED)—or a Light Amplification by Stimulated Emission of Radiation (LASER)—device as pump light source. The pump light source can also be an array of individual LASER or LED devices, respectively, to provide a required amount of pump light power.

In one embodiment of the invention, the optical system has an aperture plane, in which a mask is provided. Those features, which are additionally introduced by claim 12, are considered as an invention also independent of claim 1 and shall be disclosed in such a way. As a matter of course, also any combinations of claim 12 with other features disclosed in this application are possible.

Namely, the optical system preferably comprises a lens (lens element or lens system) defining the aperture plane, which has a certain distance (aperture distance) to the lens. In this context, the mask does not have to be provided exactly in the aperture plane, but can also be provided within the aperture distance to it (in both directions along an optical axis). The mask can for example be a graphical optical blackout (gobo) and is preferably covering an inner portion of the aperture plane. In this embodiment, the pump light can for example be coupled into the optical system and be transmitted towards the phosphor element by one single small mirror or by several small mirrors being located outside of the go-bo area in the aperture region. In this way, the mask or gobo is illuminated by converted light being transmitted from the phosphor element, wherein a secondary part of the optical system then acts as a projection lens.

A further aspect of the invention relates to a lighting system comprising at least two light source units as described above and a mirror for at least partially reflecting converted light, wherein converted light is superimposed by the mirror element. Thus, converted light having identical spectral properties can be superimposed for increasing the luminance. Likewise, also converted light, which differs in its spectral distribution, can be superimposed for a supplementation of the resulting spectrum.

It is also possible to superimpose light of three different phosphor types, for instance emitting in a red, green, and blue spectral range, wherein controlling, also feedback-controlling, the individual sources allows adjusting the resulting color. Therein, a source can be controlled by the pump light, for example by controlling a power supply, or by an optical switching element, for example to operate the light source units in a time-sequential way.

Further, the above mentioned dichroic mirror can be a cube with inner reflective planes (x cube) or a prism with inner reflective planes.

For a superposition of converted light from individual light source units being for example geometrically identical, it can be advantageous to design the optical system such that the respective aperture regions are large enough for receiving two dichroic mirrors. In this way, one mirror can be used for coupling the pump light into the respective optical system and the other mirror can be used for combining different beams of converted light. As a result, a secondary part of the optical system, being for example provided between the aperture plane and an exit aperture, can preferably be provided only once and transmits the combined beams to an exit aperture of the lighting system.

Another aspect of the invention relates to a lighting system comprising at least two light source units or an aforementioned lighting system with the optical systems of the light source units being telecentric optical systems, wherein one lens, which can be again a single lens element or a lens system, is shared by the optical sys-terns and transmits the light, for example to an exit aperture of the lighting system. Of course, also three light sources units comprising three different phosphor types can likewise share this secondary part of the optical system, such that the aforementioned colour mixing is possible.

Another aspect of the invention relates to using a light source unit, or a lighting system, or both for a fibre-optical illumination, for example in endoscopy applications, or for an application in a projection system.

DETAILED DESCRIPTION OF THE DRAWINGS

Figure 1:
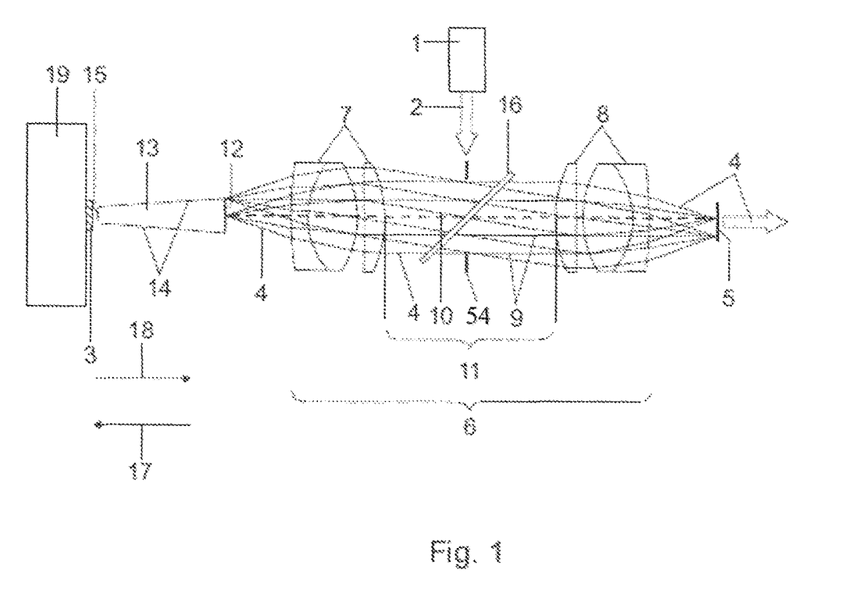
FIG. 1 illustrates a light source unit as a first embodiment having a telecentric optical system and a dichroic mirror.

FIG. 1 shows a light source unit according to the invention having a pump light source 1 for an emission of pump light 2. The pump light 2 is guided to a phosphor element 3 for a conversion into converted light 4, wherein the converted light 4 is transmitted by an optical system 6 for a further use. The optical system 6 is a telecentric optical system consisting of a first lens system 7 and an second lens system 8, such that rays 9 originating respectively from one point in an object plane are collimated in an aperture region 11 of the optical system 6 between the lens systems 7/8. The object plane is then imaged to an exit aperture 5 located subsequent to the second lens system 8.

In this way, the telecentric optical system 6 images an exit face 12, which is the above mentioned object plane, of a non-imaging optical element 13 collecting converted light from the phosphor element 3 and transmitting it to the telecentric optical system 6 by total internal reflection at its side walls 14. Therein, an air gap is provided between an entry face 15 of the non-imaging optical element 13 and the phosphor element 3 such that a refraction of converted light 4 towards the optical axis 10 results from the transition from air to the glass material of the non-imaging optical element 13.

The pump light 2 is, according to the invention, coupled to the optical system 6 by a dichroic mirror 16, which is provided within the optical system, and is transmitted (not shown in the figure) by the optical system 6, namely by the lens system 7, and the non-imaging optical element 13 to the phosphor element 3. The dichroic mirror 16 is designed for reflecting the pump light 2 and is at the same time transmitting the converted light 4. Therefore, a system of multiple layers of dielectric material is provided, likewise having a wavelength dependent reflectivity and transmissivity due to interference effects further depending on the distance between the layers and their refractive index. Since the selectivity of the dichroic mirror 16 is dependent of an angle of incidence, which alters the "effective" distance between the layers, losses due to an unintended reflection/transmission can be reduced by providing the dichroic mirror 16 in the aperture region 11, as the angular extent of a beam, namely a divergence of rays, is minimal there.

The pump light 2 is incident onto the phosphor element 3 in a main propagation direction 17 (axial to the left), and the phosphor element emits the converted light (to the right) into a hemisphere, such that an average value also gives a main propagation direction 18 of the converted light 4, which is opposite to the main propagation direction 17 of the pump light 2. Thus, the phosphor element 3 is operated in reflection mode. Therefore, it can be provided on a heat sink 19, which is optimized with respect to transferring heat from the phosphor element.

Figure 2:
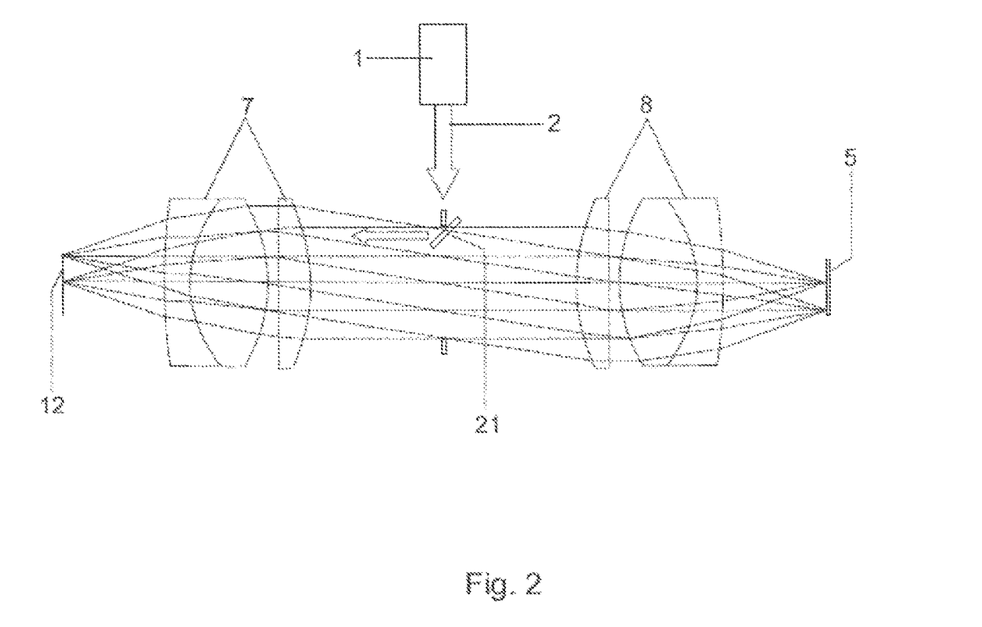
FIG. 2 shows a light source unit having a telecentric optical system and a small conventional mirror as a second embodiment.

FIG. 2 shows a modification of FIG. 1, wherein parts having the same functionality are referenced with identical numerals (as with all following figures). In this embodiment, the pump light 2 is coupled to the optical system 6 by a conventional mirror 21, which reflects the pump light 2 and the converted light 4 as well. However, the loss of converted light 4 is moderate, as the size of the mirror 21, namely its projection into a plane being perpendicular to the optical axis 10, is small with respect to the cross-section of the aperture region or aperture plane of the optical system 6. Thus, partially shadowing the converted light 4 by the mirror 21 does slightly reduce the brightness of the converted light 4 at the exit aperture 5, but does not cut a specific part from the image.

Figure 3:
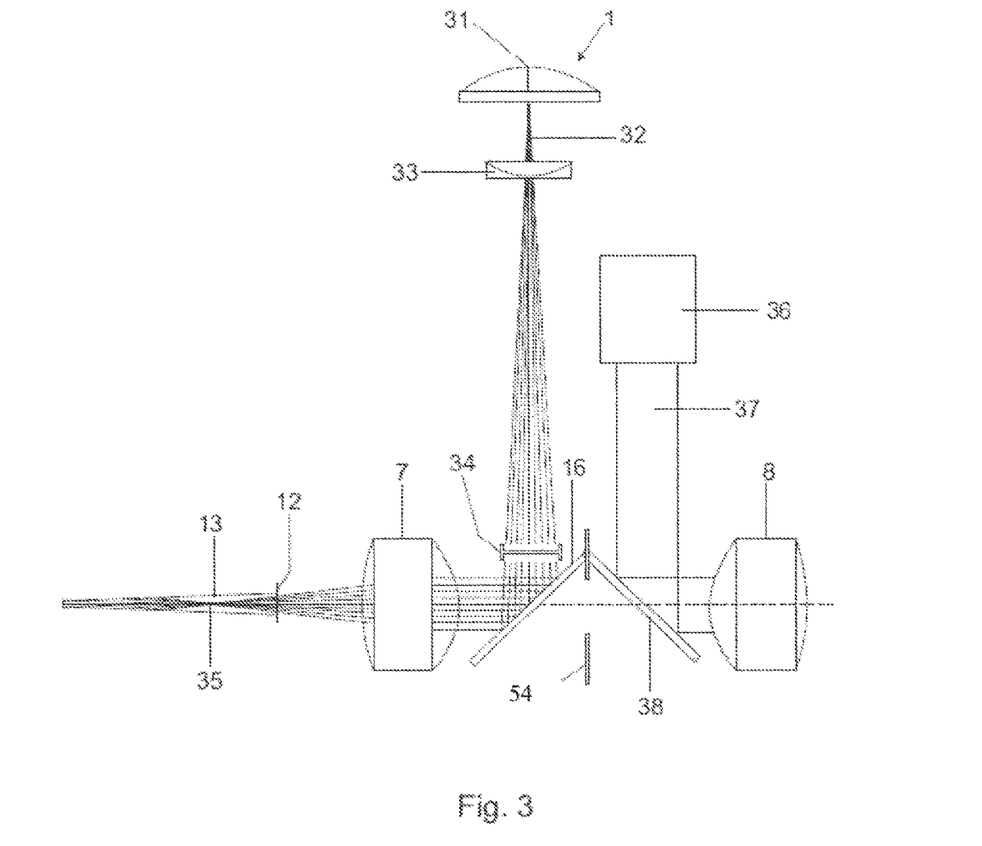
FIG. 3 shows a light source unit being pumped by laser light as a third embodiment.

The embodiment shown in FIG. 3 comprises a telecentric optical system consisting of the lens systems 7/8 and a non-imaging optical element 13 as explained with reference to FIG. 1. Further, the pump light source 1 is a single laser device 31 here, where a laser array can be provided likewise. The laser beam 32 is defocused by a lens system 33, such that it is coupled to the optical system 6 with a slightly diverging angular extent. In this way, the cross-section of the beam 32 is smaller than an image 34 of the aperture 5, as the angular extent of the laser beam 32 is smaller than the aperture angle of the optical system 6. Thus, the focus 35 of the lens 8 is shifted from the entry face 12 of the non-imaging optical element 13 (which is identical to the exit face 12 for the converted light) into the non-imaging optical element 13. Shifting the focus 35 from the entry face 12 prevents a hot spot formation on it, such that a burning of residuals on the surface can be avoided. In addition, the pump light is more efficiently mixed within the non-imaging element 13 and illuminates the phosphor element homogeneously.

Further, an additional light source 36 is provided, which emits light 37 having a spectral distribution being different from the spectral distribution of the converted light 4. The converted light 4 is not drawn in the picture for the sake of clarity, but propagates from the left to the right as shown in FIG. 2. Therein, it passes a second dichroic mirror 38, which is transmissive for the converted light 4 but reflective for the additional light 37. In this way, the additional light 37 is superimposed with the converted light 4 by the dichroic mirror 38 and exits the optical system 6 through the lens system 8.

Figure 4:
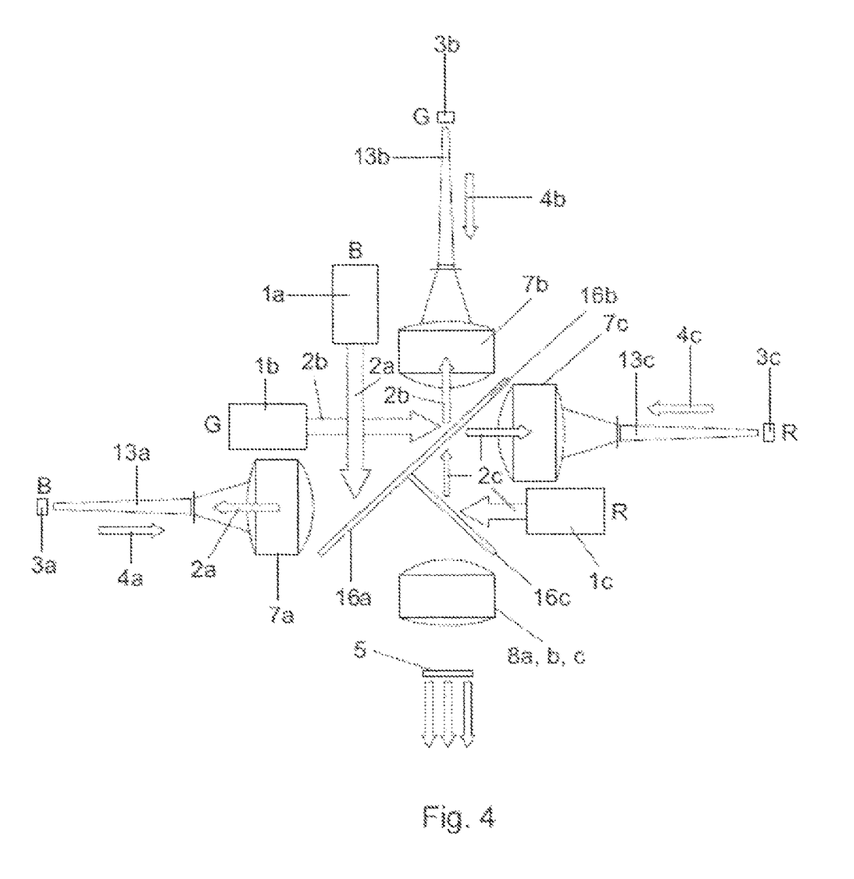
FIG. 4 illustrates a combination of three light source units as a fourth embodiment.

FIG. 4 shows a setup with three pump light sources 1a/1b/1c, each providing pump light 2a/2b/2c for one phosphor element 3a/3b/3c, respectively. Therein, the phosphor elements 3a/3b/3c are designed to emit converted light 4a/4b/4c in the red (c), the green (b), and the blue (a) spectral range, such that white light can be provided and a colour mixing is possible, respectively, by superimposing the converted light 4a/4b/4c.

Therein, a first dichroic mirror 16a is adapted for a reflection of the ultraviolet pump light 2a (pumping blue phosphor) and a transmission of the blue converted light 4a. The blue converted light 4a is then reflected by an-other dichroic mirror 16c to the lens system 8, which also collects the other converted light beams 4b/4c. The dichroic mirror 16c further reflects the pump light 2c (pumping red phosphor) to a third dichroic mirror 16b, which is reflective for the pump light 2c as well as for the red converted light 4c. Therefore, the pump light 2c is guided to the red phosphor element 3c, and the red converted light 4c is reflected by the dichroic mirror 16b. It is then transmitted by the dichroic mirror 16c and collected by the lens system 8 as well. Further, the dichroic mirror 16b reflects pump light 2b (pumping green phosphor), but transmits green converted light 3b. The green converted light 3b is superimposed with the red converted light 4c at the dichroic mirror 16b and then, as the dichroic mirror 16c is transmissive for red and green converted light 3b/4c, all three colours are superimposed at the dichroic mirror 16c and are simultaneously transmitted to the exit aperture 5 of the combined light source units.

Figure 5:
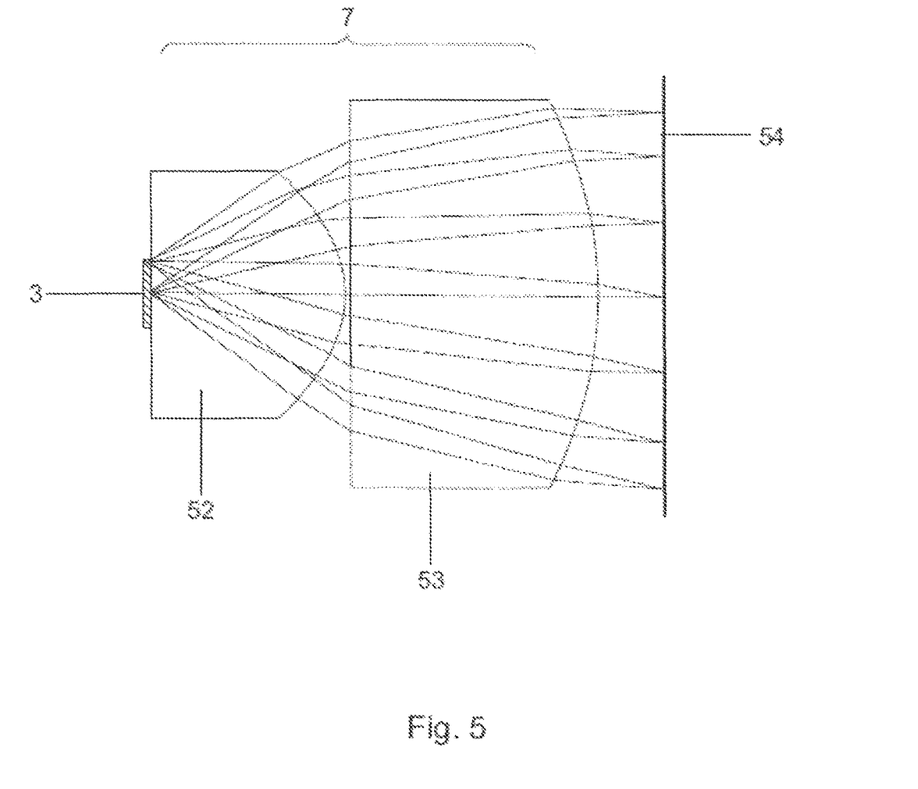
FIG. 5 shows an imaging optical system imaging a phosphor element as a fifth embodiment.

FIG. 5 shows an imaging optical element, which is the "left"/primary part of an optical system 6, for collecting the light from the phosphor element 3. Therefore a lens system 7 consisting of two lens elements 52/53 is provided. With this setup, the light coming from any individual point of the phosphor elements surface is spread over the whole aperture plane 54. The setup corresponds to those shown in FIGS. 1 and 2, besides providing no non-imaging optical element 13 between the optical system 6 and the phosphor element 3.

Figure 6:
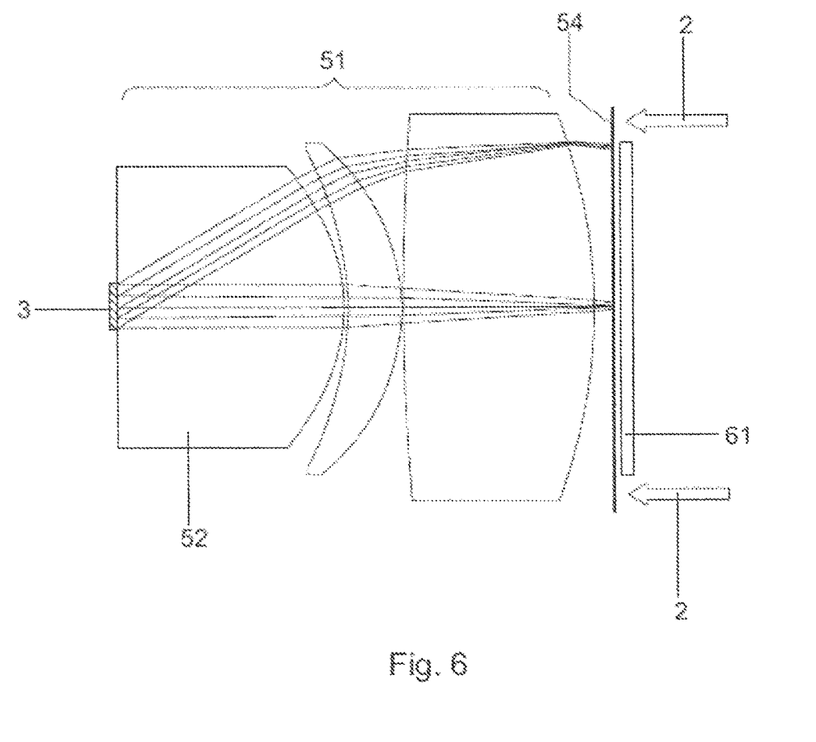
FIG. 6 shows a combination of an imaging optical system and a mask (gobo) as a sixth embodiment.

FIG. 6 shows a combination of a mask 61 and a lens system 51. The mask 61 is a gobo (graphical optical black-out) being placed in the aperture plane 54 of the lens system 51, such that it is illuminated by the converted light 4. With this embodiment, the pump light 2 is coupled to the optical system 6 in a peripheral region outside the gobo area, such that it basically bypasses the gobo 61 and is not blocked by its pattern. The peripheral coupling of pump light 2 can for example be provided as shown in FIG. 2. Further, a projection lens (not shown) can be provided to image the gobo to a screen.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A light source unit comprising:
   a pump light source for an emission of pump light;
   a phosphor element for a conversion of said pump light into converted light; and
   an optical system for transmitting at least a part of said converted light for further use, wherein:
   at least a part of said pump light is coupled into said optical system and transmitted by said optical system to said phosphor element for said conversion,
   said optical system is at least one-sided telecentric,
   said at least one-sided telecentric optical system comprises two lenses and has an aperture plane between said lenses, in which parallel rays from an object are focused and
   said pump light is coupled to said optical system between said lenses and positioned at the aperture plane.

2. The light source unit according to claim 1, wherein said optical system is symmetrical with respect to said aperture plane.

3. The light source unit according to claim 1, wherein:
said optical system comprises a mirror, and
said pump light is coupled to said mirror within said optical system.

4. The light source unit according to claim 3, wherein said optical system mirror is a dichroic mirror.

5. The light source unit according to claim 1, wherein:
said optical system is an imaging optical system,
a non-imaging optical element is provided between said phosphor element and said imaging optical system and is configured to collect said converted light, and
said imaging optical system images an exit face of said non-imaging optical element.

6. The light source unit according to claim 5, wherein:
said non-imaging optical element comprises a translucent dielectric medium, and
an air gap is provided between an entry face of said non-imaging optical element and said phosphor element.

7. The light source unit according to claim 1, wherein:
said pump light is incident in a main propagation direction onto said phosphor element and with said converted light having a main propagation direction at said phosphor element, and
said two propagation directions are opposite to each other.

8. The light source unit according to claim 1, wherein said phosphor element is provided on a heat sink that is not translucent for said pump light.

9. The light source unit according to claim 1, wherein:
said optical system has an optical axis and an aperture angle,
said pump light has a maximum angle with respect to said optical axis after said coupling, and
said maximum angle is less than said aperture angle of said optical system.

10. The light source unit according to claim 1, wherein:
said converted light has a first spectral distribution,
an additional light source is provided, said additional light source emitting additional light with a second spectral distribution that is different from said first spectral distribution, and
said additional light is coupled to said optical system and configured to superimpose said additional light with said converted light.

11. The light source unit according to claim 1, further comprising a mask in said aperture plane of said optical system.

12. A lighting system comprising at least two light source units according to claim 1 and a mirror element for at least partially reflecting converted light, wherein converted light is superimposed by said mirror element.

13. A lighting system comprising a lighting system according to claim 12, wherein said optical system of each light source unit is telecentric and has two lenses, wherein one lens is shared by said telecentric optical systems.

14. A lighting system comprising at least two light source units according to claim 1, wherein said optical system of each light source unit is telecentric and has two lenses, wherein one lens is shared by said telecentric optical systems.

* * * * *